United States Patent [19]

Kashiwazaki et al.

[11] Patent Number: 5,157,614
[45] Date of Patent: Oct. 20, 1992

[54] ON-BOARD NAVIGATION SYSTEM CAPABLE OF SWITCHING FROM MUSIC STORAGE MEDIUM TO MAP STORAGE MEDIUM

[75] Inventors: Takashi Kashiwazaki; Morio Araki; Satoshi Odagawa; Atsuhiko Fukushima; Kazuhiro Akiyama, all of Kawagoe, Japan

[73] Assignee: Pioneer Electronic Corporation, Tokyo, Japan

[21] Appl. No.: 605,364

[22] Filed: Oct. 30, 1990

[30] Foreign Application Priority Data

Dec. 13, 1989 [JP] Japan ................................ 1-323547

[51] Int. Cl.⁵ ...................... G11B 19/20; G11B 17/22; G01C 21/00
[52] U.S. Cl. ...................................... 364/443; 369/30; 369/33; 340/988; 73/178 R
[58] Field of Search ............... 364/443, 449, 446, 460; 369/33, 48, 30, 36; 340/988, 990, 995; 73/178 R

[56] References Cited

U.S. PATENT DOCUMENTS

| | | | |
|---|---|---|---|
| 4,502,123 | 2/1985 | Minami et al. | 364/449 X |
| 4,630,209 | 12/1986 | Saito et al. | 364/449 X |
| 4,706,233 | 11/1987 | d'Alayer de Costemore d'Arc | 369/33 |
| 4,796,100 | 1/1989 | Sakaguchi | 369/48 X |

Primary Examiner—Parshotam S. Lall
Assistant Examiner—Edward J. Pipala
Attorney, Agent, or Firm—Fleit, Jacobson, Cohn, Price, Holman & Stern

[57] ABSTRACT

An on-board navigation apparatus which uses a driver having a changer function to selectively reproduce any of music- and map-containing storage media. When it becomes necessary to read map data during reproduction of a music-containing medium, the current medium is replaced with the applicable map-containing medium upon arrival of an intra-music interval. This allows one driver driving both music and map data media to read map data without interrupting the piece of music being reproduced.

3 Claims, 5 Drawing Sheets

ON-BOARD NAVIGATION SYSTEM CAPABLE OF SWITCHING FROM MUSIC STORAGE MEDIUM TO MAP STORAGE MEDIUM

BACKGROUND OF THE INVENTION

1. Field of the Invention

The present invention relates to a navigation apparatus for use on board a vehicle such as an automobile.

2. Description of the Related Art

Recent years have seen the development and commercial use of those on-board navigation apparatus. In such navigation apparatus, a plurality of points on the roads in road maps are digitized into map data for storage into a storage medium such as a CD-ROM. With the current location of the vehicle recognized by suitable means, a group of map data covering a certain geographical area including the current vehicle position is read out of the storage medium. The map data is shown on a display unit in the form of a map indicating the current vehicle position and its surroundings. The current vehicle position is automatically pointed to by a vehicle position mark on the displayed map.

Such conventional on-board navigation apparatus require the successive retrieval and feeding of map data about new areas in which the vehicle travels on. New map data needs to be read continuously from the storage medium. This means that if one map-containing storage medium driver were to also serve as a for a music driver storage medium, the frequent changing of the media required on the single driver would be very troublesome and impractical. The problem is circumvented by use of two separate drivers, one dedicated to playing the music and the other for driving map-containing recording media only. However, this solution, involving installation of a twin-driver arrangement in a limited space inside the vehicle, is cumbersome and expensive.

Another conventional solution to the above problem is to use a storage medium driver having a changer function. This driver accommodates a plurality of map and music-containing storage media, one of which is selectively reproduced as desired. One disadvantage of this solution is that every time map data is read from its storage medium, the music-containing storage medium must be interrupted from being reproduced, the interruption likely being frequent.

SUMMARY OF THE INVENTION

It is therefore an object of the present invention to provide an on-board navigation apparatus which uses a storage medium driver to read music and map data selectively from a plurality of storage media, the music data being read for reproduction and the map data for navigation-oriented display, with no interruption of the music while it is being played.

In achieving the foregoing and other objects of the present invention and according to one aspect thereof, there is provided an on-board navigation apparatus comprising a reproducing means for selectively reproducing one of a plurality of storage media, one group of the media containing a plurality of map data corresponding to a plurality of geographic areas and the other group of the media containing music information, said reproducing means changing a reproducing storage medium to another reproducing storage medium corresponding to supplied storage medium identification information in accordance with a storage medium changing command, reproducing data of storage location corresponding to supplied storage location information and outputting a status information indicating operating status; a current vehicle position recognizing means for recognizing the current position of the vehicle; a map data retrieval controlling means for supplying information to the reproducing means and retrieving map data output therefrom, the supplied information comprising identification information for the map-containing storage medium containing map data covering a target area based on recognized current vehicle position information acquired by the current vehicle position recognizing means, the supplied information also comprises storage location information for the map data; a display controlling means for supplying a display means with the map data retrieved by the map data retrieval controlling means so that a map showing the current vehicle position and its surroundings is displayed; and a judging means for judging the need to retrieve map data in order to output a map data request signal; wherein, if the map data request signal being output by the judging means during reproduction of a music-containing storage medium by the reproducing means, the map data retrieval controlling means issues a storage medium changing command to the reproducing means when the reproducing means detects the reproduction of an intra-music or intra-chapter recording-free interval (hereinafter called a music interval) on the basis of the status information.

According to another aspect of the present invention, there is provided an on-board vehicle navigation apparatus which uses a driver having a changer function for selectively reproducing any of a plurality of music and map-containing storage media and which, when certain map data become necessary during reproduction of a music-containing storage medium, replaces the current music storage medium with an appropriate map storage medium as soon as the next music interval is reached, and retrieves therefore the required map data.

DETAILED DESCRIPTION OF PREFERRED EMBODIMENTS

Figure 1:
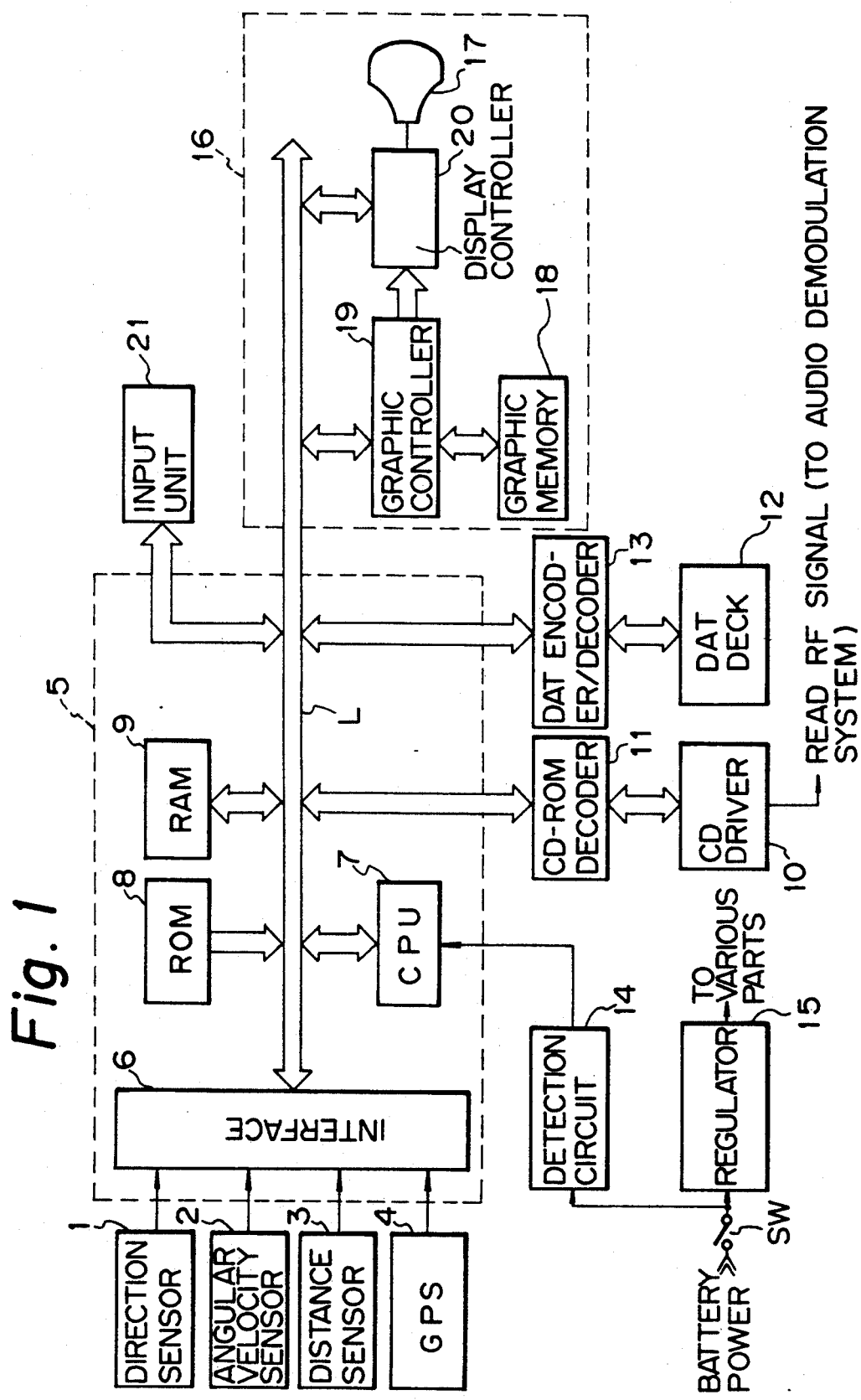
FIG. 1 is a block diagram of an on-board navigation apparatus as a preferred embodiment of the present invention.

In FIG. 1, a direction sensor 1 detects the direction in which the vehicle travels illustratively by use of geomagnetism. An angular velocity sensor 2 detects the angular velocity of the traveling vehicle. A distance sensor 3 detects the distance traveled by the vehicle. A GPS (global positioning system) receiver 4 detects the absolute position of the vehicle on the basis of latitude and longitude information. A system controller 5 is supplied with outputs from these sensors and the receiver.

The system controller 5 comprises an interface 6, a CPU (central processing unit) 7, a ROM (read only memory) 8 and a RAM (random access memory) 9. The interface 6 is supplied with outputs from the sensors 1 through 3 and the receiver 4 for such processes as analog-to-digital (A/D) conversion. The CPU 7 carries out various picture data processing and computes the vehicle's traveled distance, travel direction and current coordinates (longitude and latitude) on the basis of the data output from the sensors 1 through 3 and the receiver 4 sent by the interface 6, successively. The ROM 8 contains various processing programs for use by the CPU 7 as well as other necessary information. The RAM 9 is a memory to and from which the information required for program run is written and read.

External storage media that may be used include a CD-ROM as a read-only nonvolatile storage medium, a DAT (digital audio tape) as a nonvolatile storage medium accessible for read and write operations, and an IC card, another nonvolatile storage medium. The CD-ROM is used as a map-containing storage medium. The map data digitally representing a plurality of points of on-the-map roads is previously written on the CD-ROM, as a plurality of map data groups corresponding to a plurality of geographical areas.

A CD driver 10 has a changer which accommodates a plurality of disks and which selects one of these disks and sets it in a reproducing position inside. The CD driver 10 is capable of reproducing not only map-containing ROM disks but also conventional music-containing disks. The changer-equipped CD driver 10 may illustratively be a multiple disk player disclosed by Japanese Patent Laid-open No. 61-261851. In response to a disk changing command either internally issued in the CD driver 10 or supplied by the system controller 5, this disk player replaces the current disk to be played with the disk corresponding to the disk identification information retrieved from the command, reproduces the data from the storage location corresponding to the storage location information also retrieved from the command, and supplied the system controller 5 with status information indicating the current operating status, such as the completion of TOC (table of contents) information, the current disk number, distinction of a music disk from a map disk, ongoing reproduction of a piece of music or a music interval, and the current track number. While a map-containing ROM disk is being reproduced by the CD driver 10, the output therefrom is decoded by a CD-ROM decoder 11. The decoded data is supplied to a bus line L. A read RF signal generated during reproduction of the music disk is supplied to an audio signal demodulator system, not shown.

Meanwhile, the DAT is used as the so-called backup memory. Information is written to and read from a tape by a DAT deck 12. When the vehicle's power is turned off, the current coordinates of the vehicle and other information in effect in the RAM 9 immediately before the power-off are supplied as backup data to the DAT deck 12 via a DAT encoder/decoder 13 for recording. When the vehicle's power is restored, the information stored on the tape is read out by the DAT deck 12 therefrom. The retrieved data is supplied to the bus line L via the DAT encoder/decoder 13 for storage into the RAM 9.

Whether the vehicle's power is turned on or off is detected by a detection circuit 14 that monitors the output level of a vehicle switch known as an accessory switch SW. The power coming from a battery, not shown, enters a regulator 15 via the accessory switch SW. The regulator 15 stabilizes the power before supplying it to various parts of the vehicle. The output voltage of the regulator 15 is not lowered instantaneously because of a time constant of the regulator 15 when the accessory switch SW is turned off. During the voltage lowering period, the backup data is sent to and stored onto the DAT which is the backup memory.

While the vehicle is traveling, the CPU 7 computes the traveled direction thereof on the basis of the output of the direction sensor 1 at predetermined intervals of timer-based interruption. The CPU 7 also computes the distance traveled by the vehicle on the basis of the output of the distance sensor 3 as well as the vehicle's current coordinates using the traveled direction thereof, at intervals of a predetermined traveled distance. The map data covering a certain area including the current vehicle coordinates is read from the CD-ROM. The retrieved data is stored temporarily in the RAM 9 that acts as a buffer memory and is supplied to a display unit 16. Prior art methods such as one disclosed by Japanese Patent Laid-open No. 62-130013 may be illustratively used to find the direction in which the vehicle travels on the basis of the data from the direction sensor 1.

The display unit 16 comprises a display 17 such as a CRT, a graphic memory 18 illustratively containing a V (video)-RAM, a graphic controller 19 and a display controller 20. The graphic controller 19 takes the map data from the system controller 5, writes the data in the graphic memory 18 as picture data, and outputs the data therefrom. The display controller 20 displays a map on the display 17 on the basis of the picture data from the graphic controller 19. An input unit 21 is made up of a keyboard containing such keys as a scale key for designating a map scale and a destination key for setting a desired destination. A user supplies the system controller 5 with various commands by entering them through the input unit 21.

Below is a description of a map-containing ROM disk makeup illustratively designed to store maps of Japan.

One ROM disk contains a disk label, map control information, picture drawing parameters, a navigation program, individual map control information, units of data, and additional information. The maps comprise a nationwide map, regional maps and detailed area maps, with different groups of maps offering different levels of information detail. One ROM disk has been stored the nationwide map, the regional maps of Japan and parts of the detailed area maps. Of the multiple detailed maps stored, each map whose fringe overlaps with another map contains both fringe information indicating that the map is a fringe map and the map control information pointing out the identification number (i.e., volume No.) of a disk that stores the map data constituting the adjoining geographical area. The disk label, stored in a two-second, 16-sector CD-ROM format, contains system identification information indicating the type of the hardware used, program identification information indicating the program type, and a volume number constituting identification information specific to each disk.

When constructed as described above, the system is activated as follows. With power applied, the CD driver 10 having the changer function reads TOC information from each of a plurality of disks accommodated in a disk magazine. The read data is retained unless and until the disk magazine is changed. The read TOC information provides distinction between music disks and map disks.

Upon power-up, the CPU 7 in the system controller 5 verifies memory integrity, ascertains the internal I/O setup, and checks to see if the GPS receiver is connected, if the CD driver 10 has a changer function, and if the input unit 21 is connected. If the CPU 7 judges that the CD driver 10 is equipped with the changer function, the TOC information is read from each disk. If the TOC information indicates that the disks include map disks, the disk labels of the map disks are read for checks on system identification information. If the system identification information from any of these disks match that of the system, that disk is judged to be the applicable map disk. The program identification information and volume number of the map disk thus judged to be applicable are stored in the RAM 9. Then a check is made on the program identification information of each disk. If any of the map disks has different program identification information, a check is made to see if the disk magazine is changed on the basis of whether the status information from the CD driver 10 is different from that at the time of the power-off. If the disk magazine is not changed, the program of the previously used disk is loaded, and control is transferred to the loaded program. If the disk magazine is changed, items of the application identification information ("Want to play game?" "Want to navigate?" etc.) on each disk are displayed on the display 17, and the system waits for the user to make a choice thereof. Once the user selects an application identification information item, the corresponding disk is accessed so that the program is loaded therefrom. Control is then passed on to the loaded program.

Figure 2:
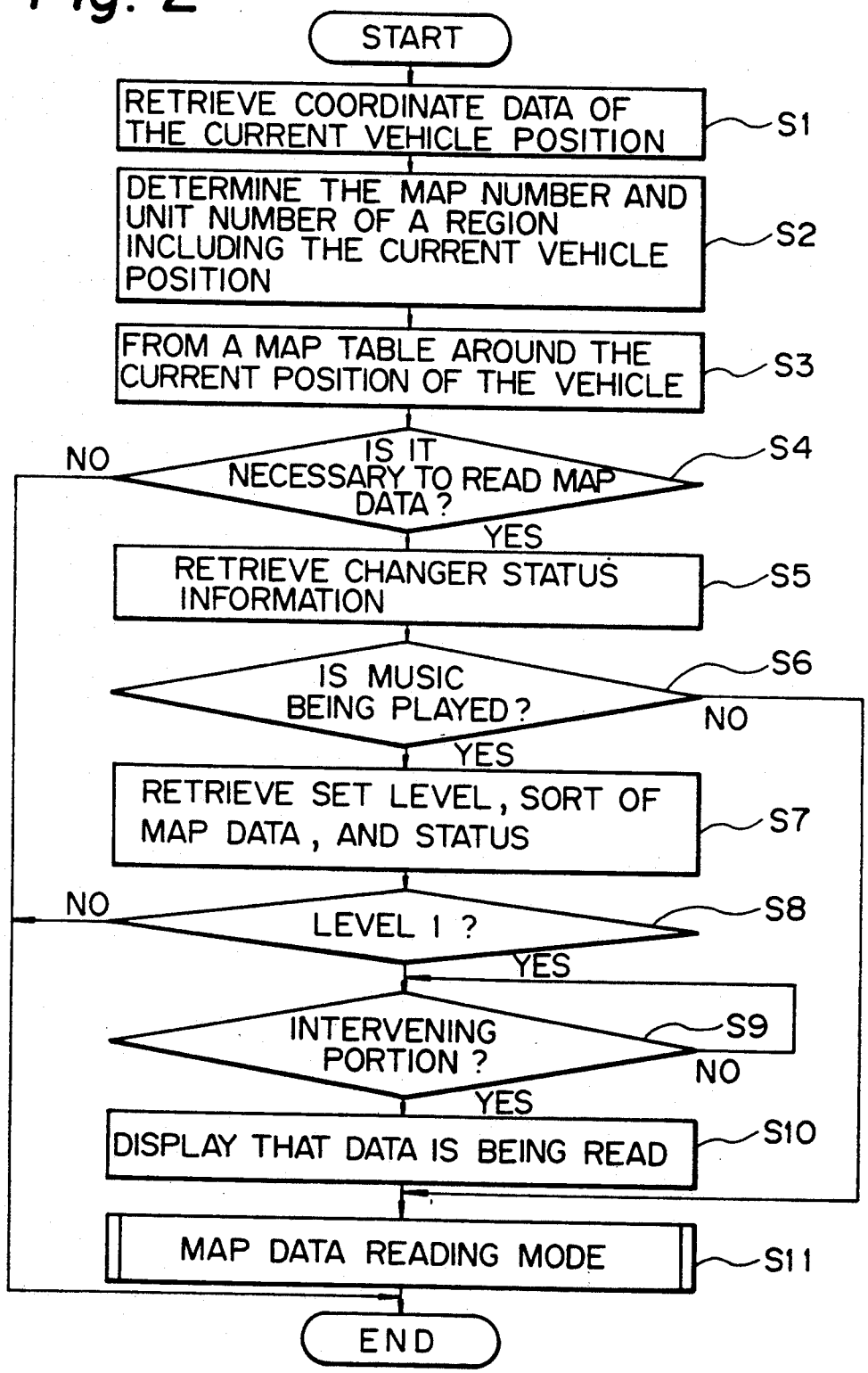
FIG. 2 is a flowchart of steps to update map data with the embodiment.

Referring to the flowchart of FIG. 2, there will be described a routine of steps that the CPU 7 carries out to update map data when the system is activated with the map disk application. In step S1, the CPU 7 gets the current vehicle coordinate data acquired by the current vehicle position recognizing operation. In step S2, using the current vehicle coordinate data, the CPU 7 determines the map number of the map showing the area centering on the current vehicle position as well as the unit number of the applicable map scale. In step S3, the CPU 7 creates a table of maps covering the current vehicle position and its surroundings. In this table, the necessity of the maps is constantly updated to reflect the level of their priority in accordance with the relationship between the current vehicle position and the unit position, i.e., an indication of how urgently each of the maps is needed after a certain period of time as the vehicle travels on. The map table contains disk numbers (volume numbers), map codes, unit codes, priority codes and a load flag (transmission complete flag).

The priority of each disk is judged illustratively in two user-specifiable levels, as follows:

Level 1: Music reproduction cannot be interrupted. At worst, either the direction or the traveled locus is displayed.

Level 2: Music reproduction may be interrupted whenever desired. When the displayed map data is about to be exhausted, the reproduction of music is interrupted so that new map data may be read in from disk.

When the map data needs to be read, the map data reading is carried out in accordance with the priority determined by these levels.

After the map data table is created in step S3, the CPU 7 checks in step S4 to see if any necessary map data is left unread. If more necessary map data needs to be read, CPU 7 enters step S5 and gets changer status information that is output by the CD driver 10. The changer status information includes a TOC read complete flag, a mounted disk number, map/music disk identification information, a music reproduction underway flag, a music interval reproduction underway flag and a track number.

In step S6, the CPU 7 checks to see if music is being reproduced on the basis of the changer status information acquired. If music is being reproduced, step S7 is reached where the above-mentioned priority level, the type of the necessary map data and the changer status information are acquired. In step S8, a check is made to see if the established priority level is level 1. If level 1 is in effect, step S9 is reached where a check is made to see if the music interval reproduction period flag is set. When the flag is found to be set, step S10 is reached where the display 17 is controlled to show a message saying that data is being read. At the same time, a read data command, the volume number of the necessary disk and the address thereof are supplied to the CD driver 10, and a map data reading mode is entered in step S11 If the priority level is found to be level 2 in step S8, this routine is terminated with no further processing carried out. If music is not being reproduced in step S6, step S11 is reached immediately.

The message indicating the ongoing reading of map data may be illustratively worded as "Map data is being loaded. Please wait . . . " The message information may be previously stored in the ROM 8 and is read therefrom as needed for display on the display unit 16, This routine is executed repeatedly while the vehicle travels on.

Figure 3:
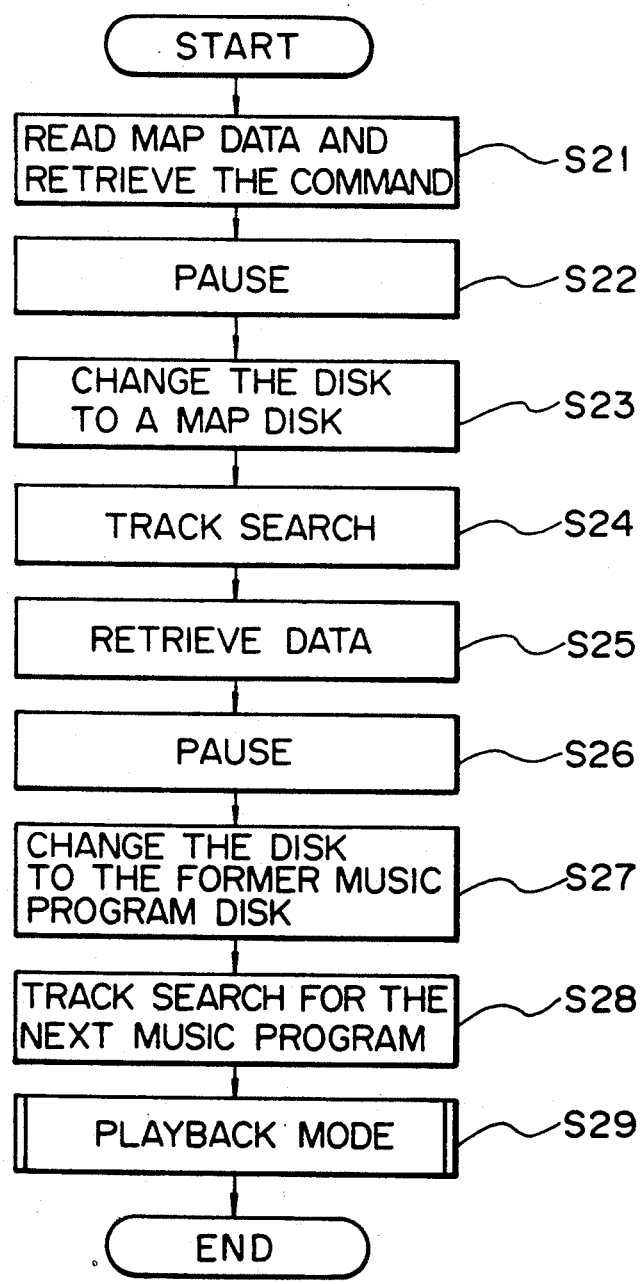
FIG. 3 is a flowchart of steps to carry out in a map data reading mode of the embodiment.

In the map data reading mode of step S11, map data is read in the steps shown by the flowchart of FIG. 3. Referring now to FIG. 3, the CD driver 10 gets a read data command in step S21. Step S21 is followed by a pause state in step S22 which in turn is followed by step S23 where the current disk is replaced by the map disk corresponding to the designated volume number. In step S24, a search is made for the address at which the map data group corresponding to the designated map number is recorded. In step S25, the necessary map data is read. The read map data is sent to the system controller 5. After the necessary map data read out, the CD driver 10 again enters a pause state in step S26. In step S27, the current map disk is replaced by the previously reproduced music disk. In step S28, a search is made for the track of the next music. After the track is reached, step S29 is entered where the reproduction mode is selected.

Figure 4:
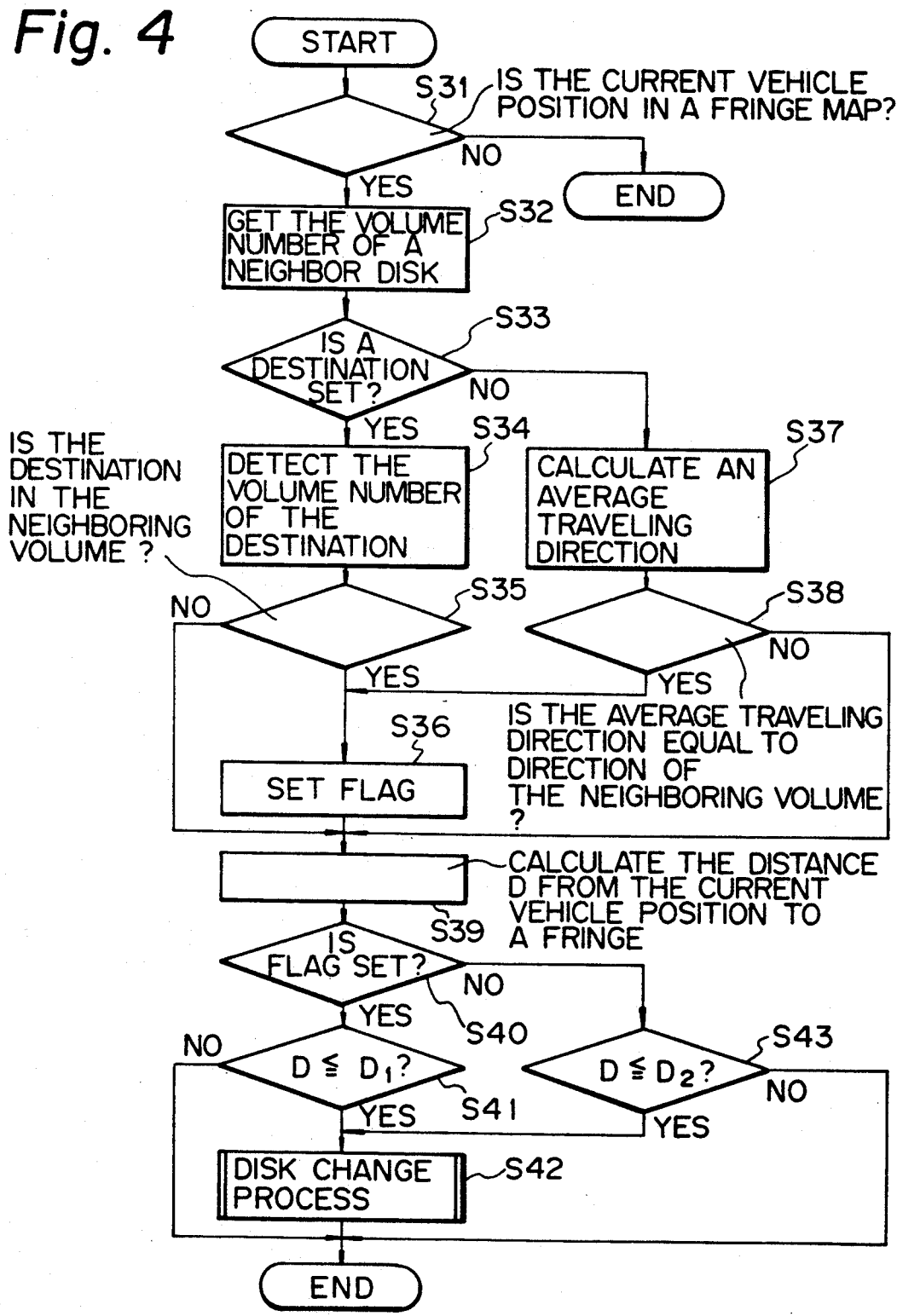
FIG. 4 is a flowchart of steps to change map containing disks according to the embodiment.

Referring now to the flowchart of FIG. 4, there will be described a routine made up of steps that the CPU 7 carries out to change map disks when new map data becomes necessary while the vehicle travels on. As described earlier, each map disk contains detailed area maps and an overall regional map on a smaller scale. Each of the map disks whose regions overlap with one another on their fringes has illustratively one map sharing an overlapping area with the disk of the adjoining region.

In step S31, the CPU 7 checks to see if the map to which the current vehicle position belongs is a fringe map contained in the map table described earlier. As described, the fringe map has the map control information containing fringe information. The presence of the fringe information indicates whether the current map is a fringe map or not. If a fringe map is found in step S31, step S32 is reached where the RAM 9 admits and stores the volume number of the disk containing the map that adjoins the map which includes the current vehicle position, the volume number being retrieved from the map control information.

In step S33, the CPU 7 checks to see if a destination is set. If a destination is set, the CPU 7 enters step S34 in which the volume number of the volume to which the coordinates of the destination belong is detected. In step S35, a check is made to see if the detected volume number is the same as that of the adjoining volume. If the destination is included in the adjoining volume, an identification flag F is set in step S36. If no destination is set in step S33, step S37 is reached where an average traveled direction is obtained by averaging the directions traveled within a predetermined distance that the vehicle has covered. In step S38, a check is made to see if the average traveled direction is toward the adjoining volume. If the vehicle's average traveled direction is toward the adjoining volume, step S36 is reached where the identification flag F is set.

Figure 5:
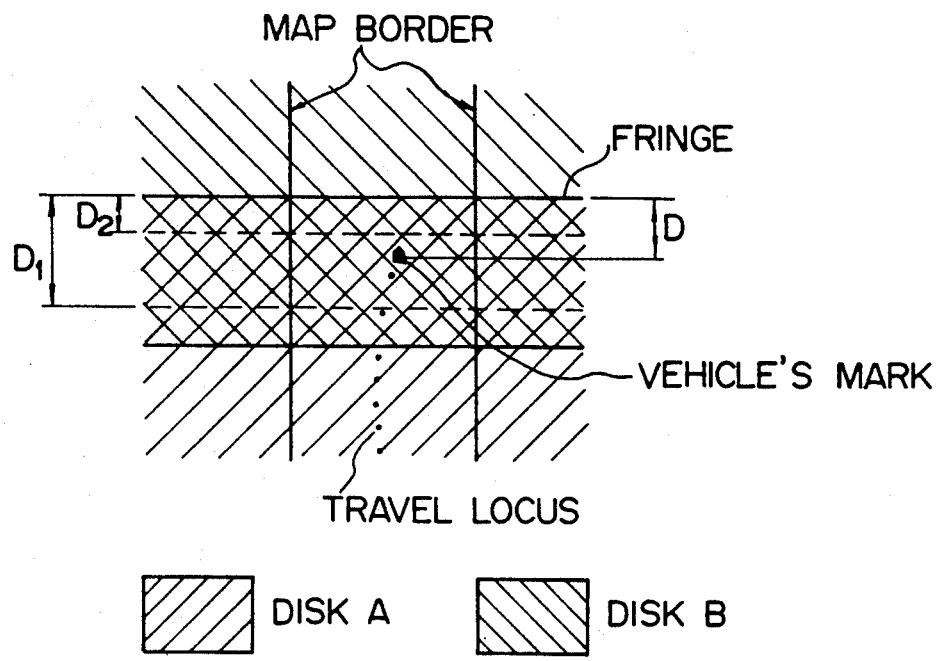
FIG. 5 is a view showing the relationship between a distance D from the current vehicle position to a map fringe and a first and a second judgment value $D_1$ and $D_2$, respectively.

In step S39, the CPU 7 obtains a distance D from the current vehicle position to the fringe of the map, as shown in FIG. 5. In step S40, a check is made to see if the identification flag F is set. If the flag F is set, a check is made in step S41 to see if the distance D is equal to or less than a first judgment value $D_1$. If $D \leq D_1$, the CPU 7 supplies the CD driver 10 with a disk changing command and the volume number of the applicable disk so that map disks are properly changed in step S42. If the identification flag F is not set in S40, a check is made in step S43 to see if the distance D is equal to or less than a second judgment value $D_2$ which is smaller than the first judgment value $D_1$. If $D \leq D_2$, step S42 is reached where map disks are appropriately changed.

The first and second judgment values $D_1$ and $D_2$ ($D_1 > D_2$) are compared with the distance D so that disks may not be changed frequently while the vehicle in the fringe area of disk A is traveling toward the area of disk B. That is, how likely the vehicle travels into the area of disk B is judged in this process. If the likelihood is high, the disks are changed earlier; if the likelihood is low, the disks are changed at a later time.

Figure 6:
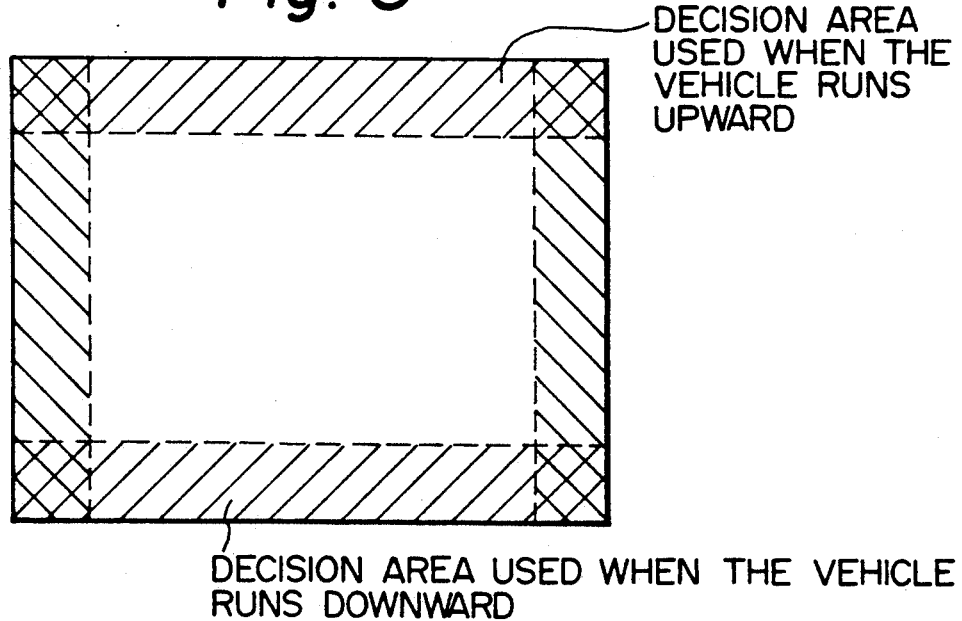
FIG. 6 is a view depicting a case in which the judgment value is a fixed value.

FIG. 6 shows a case in which a single fixed judgment value is used with hysteresis considerations. It is to be noted that this case requires changing disks at high speed.

Map disks are changed in step S42 by use of a system call that will be described below. When the program identification information and the volume number of the disk to be activated are used as parameters, if the applicable disk does not exist or if the CD driver 10 is not equipped with the changer function, an error is returned. Upon error return, the display 17 shows a message such as "Map disks need to be changed. Set volume X disk (XX region version, etc.)." The message appears while the current map data is still on display, thereby affording the user continuous navigation services with uninterrupted map indication.

If the applicable disk is found with the system call, a new program is loaded from the disk and control is transferred to the loaded program. If, the applicable disk is not found, the current navigation program is continuously executed. The vehicle travels by use of longitude and latitude information if the GPS receiver 4 is installed, or by use of sensor data if the sensors 1 through 3 are connected. And the vehicle travels in a hybrid mode combining the GPS data with the sensor data if both the GPS receiver 4 and the sensors 1 through 3 are installed. Where only region data is available, the current vehicle position is displayed on the region map. In this case, the vehicle travels without map matching.

In this manner, navigation-guided vehicle run is available using disks of other areas even if the disk containing the detailed map of the current vehicle position is absent. When a music disk is played back, the playing time between the current point of music reproduction and the next music interval is computed on the basis of the TOC information. The hybrid mode is still executed if the computed time is greater than a predetermined time, i.e., if the next music interval takes a long time to arrive, or if level 1 is in effect with music reproduction period.

As described above, the on-board vehicle navigation apparatus according to the invention uses a changer function-equipped driver to selectively reproduce music and map-containing storage media. When it is necessary to read map data during music reproduction, storage media are changed for map data retrieval upon arrival of the next music interval. This setup allows a single driver to reproduce music and to read map data without interrupting the piece of music halfway through its reproduction.

It is to be understood that while the invention has been described in conjunction with a specific embodiment, it is evident that many alternatives, modifications and variations will become apparent to those skilled in the art in light of the foregoing description. Accordingly, it is intended that the present invention embrace all such alternatives, modifications and variations as fall within the spirit and scope of the appended claims.

What is claimed is:

1. An on-board navigation apparatus for use on board a vehicle, said apparatus comprising:

reproducing means for selectively reproducing one of a plurality of storage media, one group of said media containing a plurality of map data corresponding to a plurality of geographic areas and the other group of said media containing music information, said reproducing means changing reproduction from one reproducing storage medium to another reproducing storage medium corresponding to medium identification information supplied in response to a storage medium changing command, to reproduce data of storage location corresponding to supplied storage location information and output a status information indicating operating status;

current vehicle position recognizing means for recognizing the current position of said vehicle;

map data retrieval controlling means for supplying information to said reproducing means and retrieving map data output therefrom, said supplied information comprising identification information for a map-containing storage medium containing map data covering a target area on the basis of the recognized current vehicle position information acquired by said current vehicle position recognizing means, said supplied information also comprising storage location information for said map data;

display controlling means for supplying a display means with the map data retrieved by said map data retrieval controlling means so that a map showing the current vehicle position and its surroundings is displayed;

judging means for judging the need to read map data so as to produce a map data request signal accordingly;

wherein, if said map data request signal is produced by said judging means during reproduction of a music-containing storage medium by said reproducing means, said map data retrieval controlling means issues a storage medium changing command to said reproducing means coincident with said reproducing means detecting the reproduction of an intra-music recording-free interval on the basis of said status information.

2. An on-board navigation apparatus according to claim 1, and further comprising storage means for containing predetermined message information;

wherein said display controlling means obtains said message information from said storage means and supplies said information to said display means when said map data retrieval controlling means reads in map data.

3. An on-board navigation apparatus according to claim 1, and further comprising a computing means for computing the time required to reach the next intra-music interval from the current point of reproduction while said music-containing storage medium is being reproduced;

wherein said display control means supplies said display means with information about vehicle run instead of the map data representing the currently displayed area if the time computed by said computing means is greater than a predetermined time period.

* * * * *